United States Patent
Hodrus

(10) Patent No.: US 10,337,574 B2
(45) Date of Patent: Jul. 2, 2019

(54) METHOD AND DEVICE FOR DETERMINING AN ENGAGEMENT POINT OF A HYBRID CLUTCH IN A HYBRID VEHICLE

(71) Applicant: Schaeffler Technologies AG & Co. KG, Herzogenaurach (DE)

(72) Inventor: Erhard Hodrus, Karlsruhe (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 337 days.

(21) Appl. No.: 15/307,927

(22) PCT Filed: Jun. 9, 2015

(86) PCT No.: PCT/DE2015/200350
§ 371 (c)(1),
(2) Date: Oct. 31, 2016

(87) PCT Pub. No.: WO2015/188825
PCT Pub. Date: Dec. 17, 2015

(65) Prior Publication Data
US 2017/0067518 A1   Mar. 9, 2017

(30) Foreign Application Priority Data

Jun. 13, 2014 (DE) .................... 10 2014 211 381

(51) Int. Cl.
*B60K 6/387* (2007.10)
*F16D 48/06* (2006.01)
(Continued)

(52) U.S. Cl.
CPC .............. *F16D 48/08* (2013.01); *B60K 6/387* (2013.01); *F16D 48/066* (2013.01); *B60K 6/46* (2013.01);
(Continued)

(58) Field of Classification Search
None
See application file for complete search history.

(56) References Cited

U.S. PATENT DOCUMENTS 6,022,295 A   2/2000   Liu
6,342,027 B1  1/2002   Suzuki
(Continued)

FOREIGN PATENT DOCUMENTS

DE         10031438        4/2001
DE      102008030473       1/2009
(Continued)

*Primary Examiner* — Jacob S. Scott
(74) *Attorney, Agent, or Firm* — Volpe and Koenig, P.C.

(57) ABSTRACT

The invention relates to a method for determining an engagement point of a hybrid clutch in a hybrid vehicle; which hybrid clutch is actuated by a hydrostatic clutch actuator and disconnects or connects an internal combustion engine and an electric traction drive; the engagement point is determined by slowly actuating the clutch starting from a position in which the hybrid clutch is in the non-actuated state, and monitoring a moment of the electric traction drive when a defined increase in the momentum is detected. In a method in which engagement point adaptation is optimized, a current engagement point (tp) is adapted during operation of the hybrid vehicle using a start-up routine, by which a first engagement point is determined when the hybrid vehicle is started; the hybrid clutch is moved close to a previously determined engagement point, and starting from said last determined engagement point, the hybrid clutch is displaced further until the defined increase in the moment is detected.

9 Claims, 2 Drawing Sheets

(51) Int. Cl.
*F16D 48/08* (2006.01)
*B60K 6/46* (2007.10)
*F16D 121/02* (2012.01)

(52) U.S. Cl.
CPC ..... *B60Y 2200/92* (2013.01); *B60Y 2300/427* (2013.01); *B60Y 2400/42* (2013.01); *F16D 2121/02* (2013.01); *F16D 2500/1066* (2013.01); *F16D 2500/10412* (2013.01); *F16D 2500/3065* (2013.01); *F16D 2500/3067* (2013.01); *F16D 2500/30412* (2013.01); *F16D 2500/50236* (2013.01); *F16D 2500/50245* (2013.01); *F16D 2500/50263* (2013.01); *F16D 2500/50281* (2013.01); *F16D 2500/7041* (2013.01); *F16D 2500/70605* (2013.01); *Y10S 903/914* (2013.01); *Y10S 903/946* (2013.01)

(56) References Cited

U.S. PATENT DOCUMENTS

| | | | |
|---|---|---|---|
| 8,392,083 B2 | 3/2013 | Hodrus et al. | |
| 2010/0004837 A1* | 1/2010 | Connolly | F16D 28/00 |
| | | | 701/68 |
| 2016/0076606 A1* | 3/2016 | Oshiumi | B60K 6/387 |
| | | | 701/68 |

FOREIGN PATENT DOCUMENTS

| | | | |
|---|---|---|---|
| DE | 102010024941 | 1/2011 | |
| EP | 0635391 | 7/1994 | |
| WO | 9846445 | 10/1998 | |
| WO | WO-2014021234 A1 * | 2/2014 | ............. B60K 6/445 |

* cited by examiner

METHOD AND DEVICE FOR DETERMINING AN ENGAGEMENT POINT OF A HYBRID CLUTCH IN A HYBRID VEHICLE

BACKGROUND

The invention relates to a method for determining an engagement point of a hybrid clutch of a hybrid vehicle, which is actuated by a hydrostatic clutch actuator, with the hybrid clutch separating or connecting an internal combustion engine and an electric traction drive, and when the internal combustion engine is off, the engagement point is determined by slowly operating the hybrid clutch, starting with a position of the hybrid clutch which it assumes in a disconnected state, while monitoring the torque of the electric traction drive when a defined increase in torque is detected, as well as a device for implementing the method.

DE 10 2010 024 941 A1 discloses a method for controlling a duplex clutch with at least two partial drivetrains, each of which potentially being coupled via a clutch to the internal combustion engine. During drive operation of the vehicle comprising the duplex clutch transmission, an engagement point of the clutch is determined independently from the torque of the motor. This engagement point is here determined during the start of the vehicular operation and then adapted during the operation of the vehicle.

In a hybrid vehicle with a hybrid drivetrain the driving resistance can be overcome by two independent energy sources, such as using fuel of an internal combustion engine and electric energy from a traction battery of an electric engine, by way of converting them into mechanical energy. According to DE 10 2008 030 473 A1 a method is known for determining an engagement point of an automatic hybrid clutch in a hybrid drivetrain. The engagement point of the hybrid clutch arranged between an internal combustion engine and an electric traction drive is determined when the combustion engine is off by slowly closing the hybrid clutch and evaluating the influence of the closing hybrid clutch upon the electric machine of the electric traction drive which rotates with a predetermined speed. This hybrid clutch allows in the open state a purely electric driving of the hybrid vehicle, while in the closed state the torque of the internal combustion engine is transferred to the driving wheel.

SUMMARY

Another objective of the hybrid clutch relates to the starting of the internal combustion engine. For this purpose, by a targeted increase of the torque of the electric motor and closing of the hybrid clutch, energy is transferred to the stationary internal combustion engine and this way it is accelerated. With regards to driving comfort here the torque transmitted by the hybrid clutch must be known precisely in order to avoid any unintentional acceleration of the vehicle, because the torque of the electric motor is simultaneously transferred to the driving wheels.

The torque transmitted by the hybrid clutch is directly dependent on the position of a clutch actuator, electrostatically actuating the hybrid clutch. In order to estimate the transmitted clutch torque, on the one hand, the position of the clutch actuator must be known in reference to its potential displacement path, and on the other hand, a clutch characteristic (clutch torque as a function of the position of the actuator) must be referenced to the actuator path. The engagement point represents here a support point of the clutch characteristic. The engagement point must be determined once for the operation and then adjusted during operation to the changing clutch behavior, which is not constant due to various influencing factors, such as wear and tear, readjustments of the clutch, and temperature, as well as aging processes. It is known to determine the engagement point by a diagnostics service when starting the operation of the hybrid vehicle. An essential disadvantage of this determination of the engagement point is the fact that the engagement point adaptation, which is performed during the start of operation, takes too long to be suitable for an adaptation of the engagement point during driving operation of the hybrid vehicle.

The invention is therefore based on the objective of providing a method for determining an engagement point which can be used for the adaptation of the engagement point during the driving operation of the hybrid vehicle.

According to the invention, the objective is attained such that a given engagement point is adapted during the operation of the hybrid vehicle, with a start-up routine being used for adapting a given engagement point during the operation, by which a first engagement point is determined during the start of operation of the hybrid vehicle, with the hybrid clutch approaching a previously determined engagement point and the hybrid clutch, starting from this most-recently determined engagement point, being further displaced until a defined increase in torque is detected. This is advantageous in that during the adaptation of the engagement point while the hybrid vehicle is in driving operation this adaptation process can be considerably shortened because a previously determined engagement point is used for the adaptation of the engagement point, considerably shortening the start-up routine used. The presently given engagement point can therefore be determined considerably faster.

Advantageously, the first engagement point of the hybrid clutch is determined during the start of operation of a hybrid vehicle by using the start-up routine, which is considered for a first adaptation as the previously determined engagement point in order to determine the presently given engagement point. By this first engagement point determined during the start-up of the hybrid vehicle the range is already known in which a shift of the engagement point is assumed, so that the hybrid clutch can be displaced into this area during the adaptation phase and thus the time for determining the presently given engagement point can be shortened.

In one embodiment the most recently determined engagement point, which was determined in the adaptation phase directly preceding the present adaptation phase, is used as the previously determined engagement point. In this approach, by using the engagement point determined in the directly preceding adaptation cycle, a very rapid approaching to a potentially given engagement point is possible, shortening the time for determining the actually given engagement point.

In one variant, conclusions are drawn about a previously defined increase in torque when a predetermined threshold for torque increase is exceeded, with the predetermined threshold being increased repeatedly towards a maximally increasing torque of the engagement point until the increase in torque produced by the electric traction drive is at least equivalent to the amount of the torque at the engagement point. By the repeated approach towards the threshold, which can occur preferably with differently increasing torque levels, a particularly precise determination of the torque of the engagement point can be realized, allowing to precisely determine the adapted presently given engagement point.

In one embodiment the engagement point of the hybrid clutch is adapted from the torque of the engagement point which is equivalent to the torque increase produced by the electric traction drive using a monitor of control technology.

This is required in order to avoid any undefined condition in the hysteresis of the clutch torque.

In one alternative, the engagement point of the hybrid clutch is adapted from the torque of the engagement point from a characteristic of the hybrid clutch which is equivalent to the torque increase produced by the electric traction drive. The use of a software method and thus a monitor of control technology requiring extensive computing time can therefore be waived here.

In one embodiment, after the engagement point has been adapted the hybrid clutch is returned to the position assumed during disengaged periods, with it being checked here if the torque produced by the electric traction drive is consistent to the torque of the electric traction drive produced thereby at this position of the hybrid clutch at the beginning of the present adaptation phase. This way it is examined if before and after the adaptation phase the torque of the electric traction drive shows the same level, allowing to exclude any disturbing influences when determining the engagement point and thus the engagement point of the control of the hybrid clutch determined in this fashion can be used.

In one embodiment, during the start of operation of the hybrid vehicle, a calculated engagement point is used as the previously determined engagement point. The use of such a calculated engagement point also allows, in a determination of the engagement point for the first time, that the start-up routine for determining the engagement point is not excessively long in order to approach the actually given first engagement point.

A further development of the invention relates to a device for controlling a hybrid clutch of a hybrid vehicle, which can be operated by a hydrostatic clutch actuator, with the hybrid clutch being arranged between an internal combustion engine and an electric traction drive. In such a device the hybrid clutch is controlled according to a feature explained in this patent application.

BRIEF DESCRIPTION OF THE DRAWINGS

The invention allows numerous embodiments. One of them shall be explained in greater detail based on the figures shown in the drawings.

Shown are.

Identical features are marked with the same reference character.

DETAILED DESCRIPTION OF THE PREFERRED EMBODIMENTS

Figure 1:
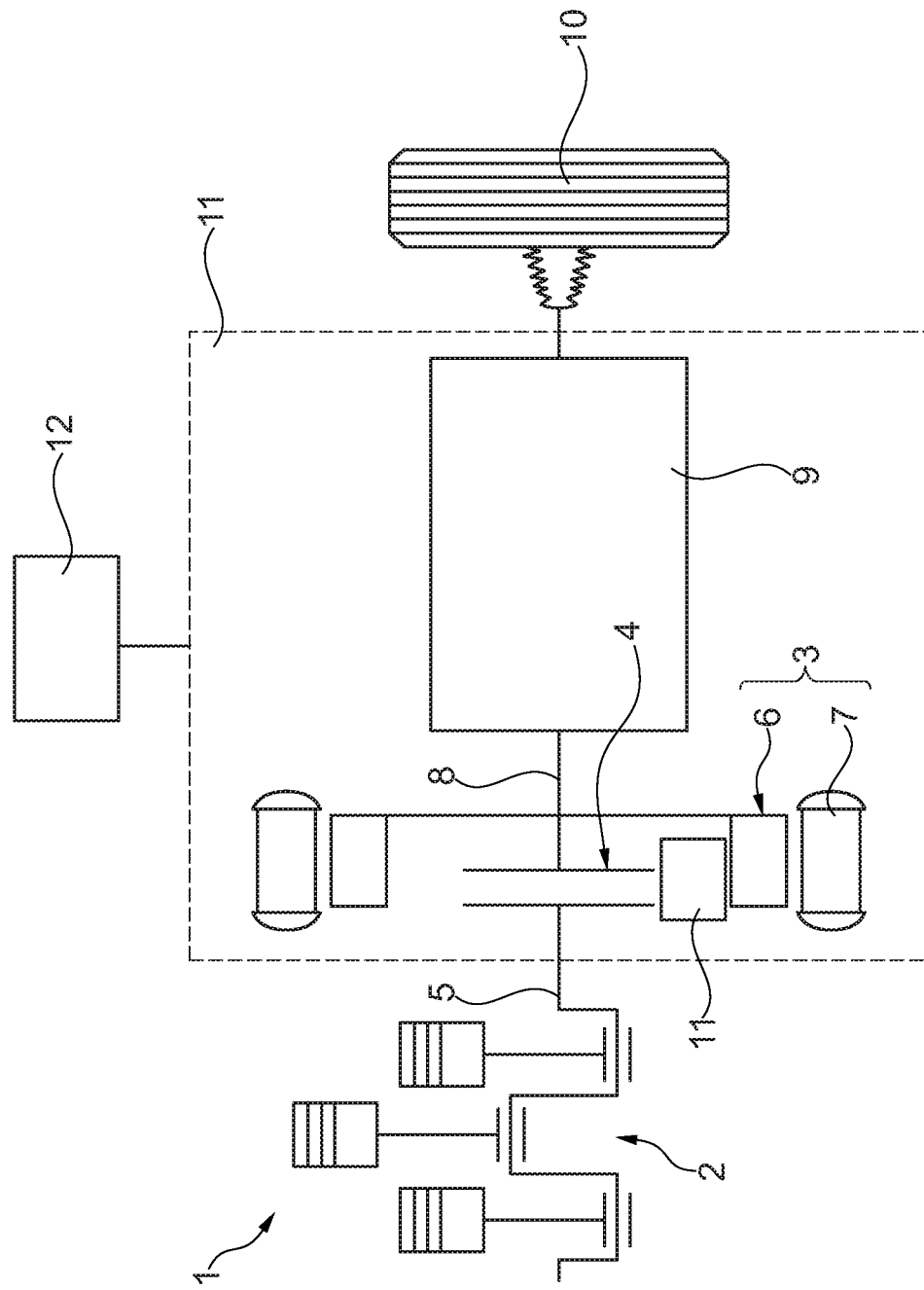
FIG. 1 an illustration of the principle of a hybrid drive.

FIG. 1 shows an illustration of a principle of a drivetrain of a hybrid vehicle. This drivetrain 1 comprises an internal combustion engine 2 and an electric motor 3. A hybrid clutch 4 is arranged between the internal combustion engine 2 and the electric motor 3, directly downstream the internal combustion engine 2. The internal combustion engine 2 and the hybrid clutch 4 are connected to each other via a crankshaft 5. The electric motor 3 comprises a rotational rotor 6 and a fixed stator 7. The driven shaft 8 of the hybrid clutch 4 is connected to a transmission 9, which comprises a coupling element not shown in greater detail, for example a second clutch or a torque converter, arranged between the electric motor 3 and the transmission 9. The transmission 9 transfers the torque generated by the internal combustion engine 2 and/or the electric motor 3 upon the driving wheels 10 of the hybrid vehicle. The hybrid clutch 4 and the transmission 9 form here a transmission system 11, which is controlled by a hydrostatic actuator 12.

It is furthermore assumed that the hybrid clutch 4 represents a normally closed clutch. However, the method can also be applied without major changes in a normally open clutch. The hybrid clutch 4 arranged between the internal combustion engine 2 and the electric motor 3 is closed in order to start the internal combustion engine during the operation of the hybrid vehicle 2 using the torque generated by the electric motor 3 or during boost operation to drive using the driving internal combustion engine 2 and the electric motor 3. The hybrid clutch 4 is here operated by an electrostatic clutch actuator 12. In order to ensure that during the restart of the internal combustion engine 2 by the electric motor 3 sufficient torque is provided by the electric motor 3, which moves both the hybrid vehicle via the driving wheels 10 without losing any comfort and simultaneously actually starts the internal combustion engine 2, here a precise knowledge of a clutch characteristic of the hybrid clutch 4 is required, in which a clutch torque is shown over the actuator path. An interface of this clutch characteristic is the engagement point, which is understood as the position of the hybrid clutch at which the friction areas of the input and/or output part of the hybrid clutch engage in a frictional contact.

This engagement point is of particular importance for the control of the hybrid clutch and thus it is determined during the initial start of operation of the hybrid vehicle and adapted during the driving operation of the hybrid vehicle. The determination of the engagement point occurs when the internal combustion engine is turned off. In order to determine the engagement point here a target clutch torque applied at the hybrid clutch 4 is constantly increased until a drive torque can be detected at the electric engine 3 that can be allocated to the target clutch torque. Here it is conditional that the hybrid clutch 4 is in an open state and then slowly moved towards the closed state, while the torque of the electric motor 3 being monitored, with the electric traction drive comprising the electric motor 3 being in a speed-controlled operation, thus showing a stable number of rotations per time unit. The hybrid clutch 4 is therefore moved towards the closed position until the frictional engagement areas of the input and the output part of the hybrid clutch 4 reach a frictional engagement and a minimal torque is transferred to the electric motor 4, which is detected by an appropriate reaction of the electric motor 3. This appropriate reaction comprises that a defined increase in torque is given by the electric motor 3.

Figure 2:
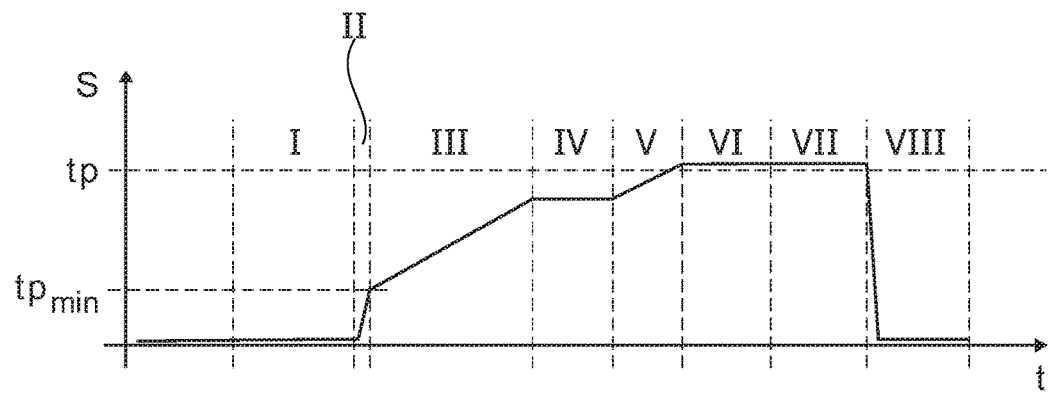
FIG. 2 an illustration of the principle of determining an engagement point when initially starting operation of a hybrid vehicle according to a method of the invention, and FIG. 3 an illustration of the principle of determining an engagement point during the operation of a hybrid vehicle according to a method of the invention.

When the hybrid vehicle is started for the first time here a start-up operation is initiated in order to determine the first engagement point, which shall be explained in greater detail based on FIG. 2. The start-up routine comprises eight phases, with FIG. 2 showing the actuator path s over a time t. The dot-dash line displays the engagement point tp expected. In phase I the hybrid clutch 4 is open, and a torque-offset is determined of the electric motor 3 of the electric traction drive. By closing the hybrid clutch 4 the torque of the electric motor 3 is increased by the offset determined in this fashion.

In phase II the hybrid clutch 4 is closed to a minimum engagement point position $tp_{min}$, with this minimum engagement point position $tp_{min}$ being determined by way of calculation. When adjusting this minimal engagement point position, which assumes a predetermined period of time the torque of the electric traction drive 3 is further monitored. In the subsequent phase III the hybrid clutch 4 is slowly closed with the hybrid clutch 4 here exhibiting a constant speed. During the closing process of the hybrid clutch 4 the torque of the electric motor 3 of the electric traction drive is further monitored. Subsequently a phase IV is reached, in which the torque of the electric motor 3 of the electric traction drive exceeds a predetermined threshold. By cyclically performing phases III and IV this predetermined threshold is gradually increased until an engagement point torque is reached, and the electric motor 3 of the electric traction drive shows a torque increase of at least the value of the torque of the engagement point. During the cyclical performance of the phases III and IV different torque levels are used, for example 1 Newton, 3 Newton, or 5 Newton as predetermined thresholds. This way the hybrid clutch 4 gradually approaches the torque of the engagement point. This gradual approach is repeated in phases V and VI, with the phase V being equivalent to phase III and the phase VI equivalent to phase IV.

In the subsequent phase VII the engagement point tp is adapted via a monitor using control technology in order to ensure that the hybrid clutch 4 is closed to prevent that an undefined state is yielded in the hysteresis of the clutch torque. By only closing the hybrid clutch 4 it is ensured that the hybrid clutch moves only on one hysteresis branch.

Subsequently, in a phase VIII the hybrid clutch 4 is opened again and it is checked if the torque level of the electric motor 3 of the electric traction drive at the end of the start-up process is equivalent to the torque level, which the electric motor of the electric traction drive produced at the beginning of the start-up routine.

This start-up routine, in which the engagement point tp is determined for the first time, is followed during the driving process of the hybrid vehicle by adaptation phases, in which the engagement point tp determined in this fashion is adapted in order to this way consider any change of the engagement point tp due to wear and tear, temperature, and similar factors, and allow a precise control of the clutch actuator 12.

Figure 3:
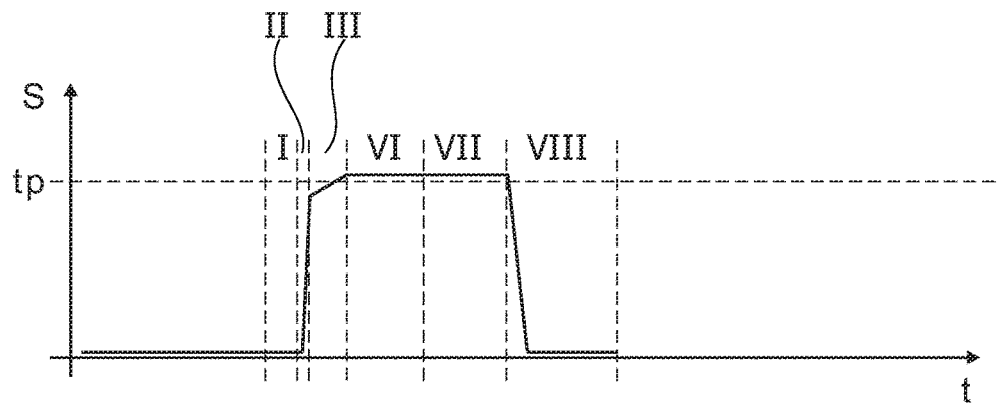

During adaptation of the engagement point when the hybrid vehicle is driving the start-up routine is utilized, which was used in the initial start-up of the hybrid vehicle in the context with FIG. 2. Due to the fact that the first engagement point tp is already known from the initial start-up process, it is used in phase II, as shown in FIG. 3, in order to move the hybrid clutch 4 almost to an engagement point position known. By the rapid approach of the hybrid clutch 4 to the known engagement point position here the phases I and II are shortened. Then, phase III follows in which a hybrid clutch 4 is slowly moved towards the closed position and the torque produced by the electric motor 3 of the electric traction drive is further monitored. Due to the fact that, based on the knowledge of the previous engagement point, the presently given engagement point tp can be approached rather closely, the phase III also shortens. A cyclical repetition to detect the engagement point is waived, thus phase III is immediately followed by phase VI and phase VII. In phase VII, here the engagement point tp is also adapted via a monitor using control technology, while in phase VIII the hybrid clutch 4 is opened and the torque level of the electric motor 3 of the electric traction drive is compared, with the hybrid clutch 4 here being open at the end of the adaptation phase, to the torque level of the electric motor 3 of the electric traction drive with the hybrid clutch 4 being open in phase I. As discernible from FIG. 3, the adaptation of the presently given engagement point tp is considerably shortened when the hybrid vehicle is driving in reference to the initial start of operation.

Instead of the monitor calculating the engagement point completely anew, it is advantageous to modify the old engagement point in the direction towards the presently given engagement point. This has a smoothening effect, causing falsely determined engagement points to be of only reduced influence. Phase VII can be completely omitted when instead of a monitor using control technology the engagement point is calculated using the clutch characteristic. When using the electric motor 3 of the electric traction drive the adaptation of the engagement point is possible both in positive as well as in negative speeds. Alternatively, the shortened engagement point routine can also be used when engaging the internal combustion engine.

In case of the suggested determination of the engagement point the engagement point is detected during the driving operation of the hybrid vehicle in the same fashion as during the start-up operation. Due to the fact that the engagement point is precisely predetermined by the initial start-up operation the hybrid clutch 4 can close until shortly before the expected actually given engagement point and then close even further until the defined change of torque is detected.

LIST OF REFERENCE CHARACTERS

1 Drivetrain
2 Internal combustion engine
3 Electric motor
4 Hybrid clutch
5 Crankshaft
6 Rotor
7 Stator
8 Driven shaft
9 Transmission
10 Drive wheels
11 Transmission system
12 Hydrostatic actuator

The invention claimed is:
1. A method for determining an engagement point of a hybrid clutch of a hybrid vehicle, which is operated by a hydrostatic clutch actuator, with the hybrid clutch separating an internal combustion engine from an electric traction drive or connecting them, the method of determining the engagement point comprising:
operating the hybrid clutch, starting from a position of the hybrid clutch that the clutch assumes in a disengaged condition, while monitoring a torque of the electric traction drive,
when a defined increase in the torque is detected, adapting a presently given engagement point (tp) during operation of the hybrid vehicle using a start-up routine for adaptation of the presently given engagement point (tp) during operation by which a first engagement point is determined during a start-up operation of the hybrid vehicle in which the hybrid clutch approaches a previously determined engagement point and further dis- placing the hybrid clutch starting from said previously determined engagement point until the defined increase in torque is detected.

2. The method according to claim 1, wherein during the start-up operation of the hybrid vehicle a first engagement point of the hybrid clutch is determined via the start-up routine, said first engagement point is used as the previously determined engagement point for a first adaptation in order to determine the presently given engagement point (tp) during operation of the hybrid vehicle.

3. The method according to claim 1, wherein a most recently determined engagement point determined in an adaptation phase immediately prior to a current adaptation phase is used as the previously determined engagement point.

4. The method according to claim 1, wherein closing occurs for an upcoming defined increase in torque when a predetermined threshold of the torque increase is exceeded, with the predetermined threshold being repeatedly increased until an engagement torque is reached, at which the torque increase produced by the electric traction drive is at least equivalent to a value of the torque of the engagement point.

5. The method according to claim 4, wherein the engagement point of the hybrid clutch is adapted from the torque of the engagement point equivalent to an increase in torque produced by the electric traction drive using a monitor applying control technology.

6. The method according to claim 4, wherein the engagement point of the hybrid clutch is adapted from the torque of the engagement point equivalent to an increase in torque produced by the electric traction drive using a characteristic of the hybrid clutch.

7. The method according to claim 1, wherein after the adaptation of the engagement point the hybrid clutch is returned to a position assumed in a disengaged state, and checking if the torque produced by the electric traction drive is equivalent to the torque of the electric traction drive which was produced thereby at said position of the hybrid clutch at a beginning of a current adaptation phase.

8. The method according to claim 1, wherein during the start-up routine of the hybrid vehicle a calculated engagement point is used as the previously determined engagement point.

9. A device for controlling a hybrid clutch of a hybrid vehicle, which is operatable by a hydrostatic clutch actuator, with the hybrid clutch being arranged between the internal combustion engine and the electric traction drive, and controlling the hybrid clutch according to the method of claim 1.

* * * * *